United States Patent
Broad et al.

(10) Patent No.: US 10,733,165 B1
(45) Date of Patent: Aug. 4, 2020

(54) DISTRIBUTED PROCESSING USING A NODE HIERARCHY

(71) Applicant: WORKIVA INC., Ames, IA (US)

(72) Inventors: MacLeod Broad, Sault Ste Marie (CA); Joseph Strach, Sault Ste Marie (CA); Mark Shaule, Sault Ste Marie (CA)

(73) Assignee: WORKIVA INC., Ames, IA (US)

( * ) Notice: Subject to any disclaimer, the term of this patent is extended or adjusted under 35 U.S.C. 154(b) by 1400 days.

(21) Appl. No.: 14/791,633

(22) Filed: Jul. 6, 2015

(51) Int. Cl.
*G06F 16/22* (2019.01)
*G06F 9/52* (2006.01)

(52) U.S. Cl.
CPC ............ *G06F 16/2255* (2019.01); *G06F 9/52* (2013.01); *G06F 16/2246* (2019.01)

(58) Field of Classification Search
CPC .......................... G06F 17/3033; G06F 16/2255
USPC ........................................................ 707/747
See application file for complete search history.

(56) References Cited

U.S. PATENT DOCUMENTS

| | | | | |
|---|---|---|---|---|
| 4,403,286 A * | 9/1983 | Fry | .......................... | G06F 9/505 710/15 |
| 5,214,652 A * | 5/1993 | Sutton | ................. | G06F 11/2038 714/10 |
| 6,526,163 B1 * | 2/2003 | Halmann | ............ | G01S 7/52044 382/128 |
| 8,108,875 B2 * | 1/2012 | Dillenberger | ........... | G06F 9/505 709/224 |
| 8,321,870 B2 | 11/2012 | Messier et al. | | |
| 2011/0145037 A1 * | 6/2011 | Domashchenko | ..... | G06Q 10/06 705/7.27 |
| 2011/0302226 A1 | 12/2011 | Abadi et al. | | |
| 2012/0151491 A1 * | 6/2012 | Georgis | ................ | G06F 9/5066 718/104 |
| 2012/0180061 A1 * | 7/2012 | Rao | ........................ | G06F 9/5088 718/104 |
| 2012/0304192 A1 | 11/2012 | Grove et al. | | |
| 2012/0311570 A1 * | 12/2012 | Gandhi | ................. | G06F 9/5027 718/1 |

(Continued)

OTHER PUBLICATIONS

Elteir et al., "Enhancing MapReduce via Asynchronous Data Processing," ICPADS'10 Proceedings of the 2010 IEEE 16th International Conference on Parallel and Distributed Systems, Dec. 8-10, 2010, pp. 397-405, IEEE Computer Society, Washington, DC.

*Primary Examiner* — Jensen Hu
(74) *Attorney, Agent, or Firm* — Faegre Drinker Biddle & Reath LLP

(57) ABSTRACT

A method for traversing a node tree, having a root node and a hierarchy of child nodes, to a selected child node is described. A node identifier of the root node is determined by performing a hash function with at least a seed value for the node tree. Each child node of the hierarchy has a respective node identifier determined by performing the hash function with i) the seed value, ii) a node identifier of a parent node of the child node, and iii) a child index of the parent node. The selected child node's node identifier is determined by performing the hash function with i) the seed value, ii) the node identifier of the selected child node's parent node, and iii) the child index of the parent node for the selected child node. A retrieval of data stored at a location indicated by the node identifier of the selected child node is caused.

20 Claims, 7 Drawing Sheets

(56) References Cited

U.S. PATENT DOCUMENTS

| | | | |
|---|---|---|---|
| 2012/0317579 A1* | 12/2012 | Liu | G06F 11/1438 718/104 |
| 2013/0144973 A1 | 6/2013 | Li et al. | |
| 2013/0151535 A1 | 6/2013 | Dusberger et al. | |
| 2013/0318126 A1 | 11/2013 | Graefe et al. | |
| 2014/0026144 A1* | 1/2014 | Pack | G06F 9/505 718/105 |
| 2014/0032528 A1 | 1/2014 | Mandre et al. | |
| 2014/0115282 A1 | 4/2014 | Natkovich et al. | |
| 2015/0032780 A1* | 1/2015 | Huras | G06F 17/30339 707/803 |

* cited by examiner

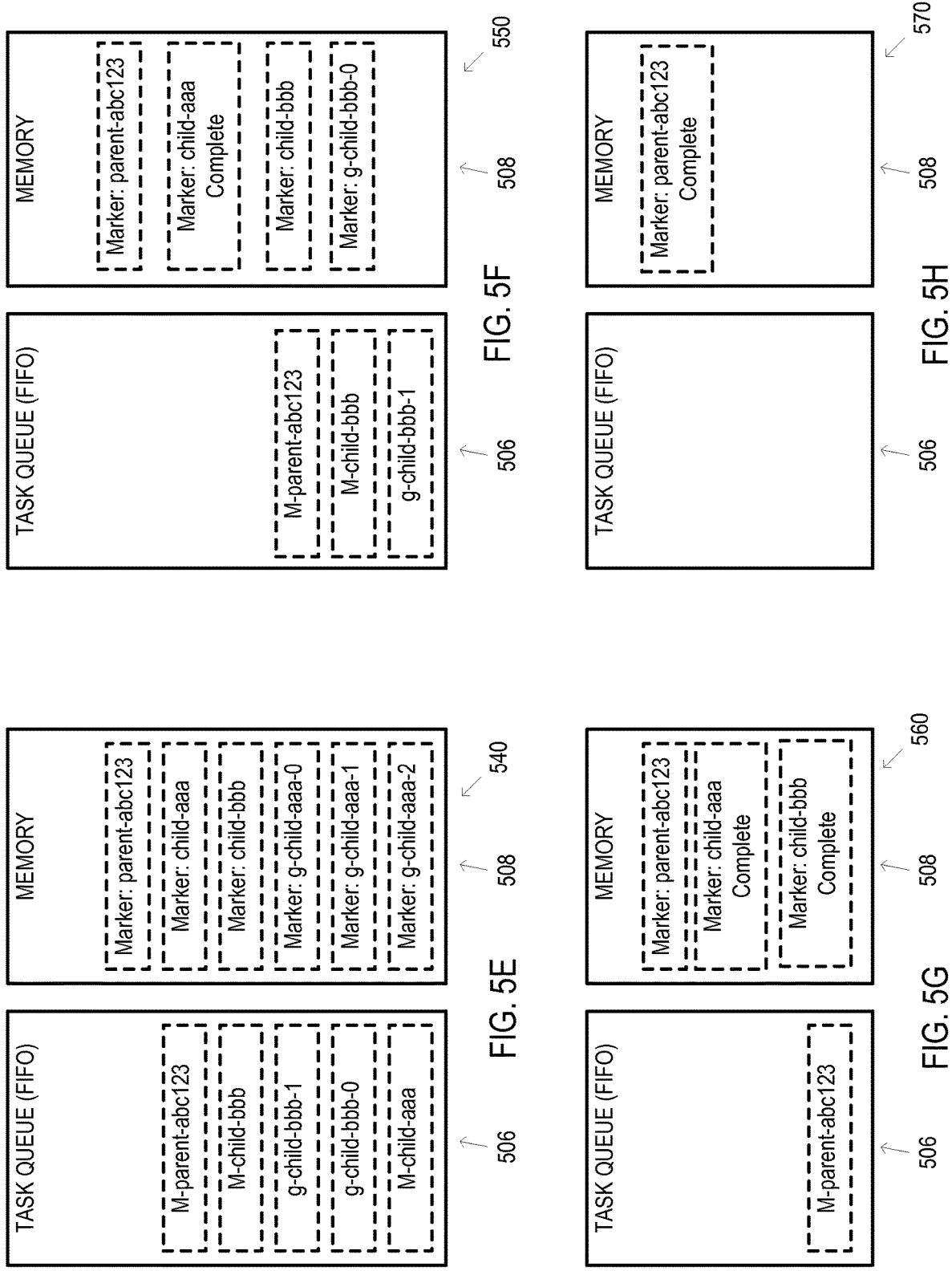

US 10,733,165 B1

DISTRIBUTED PROCESSING USING A NODE HIERARCHY

TECHNICAL FIELD

The present disclosure is related generally distributed processing platforms and, more particularly, to managing a distributed task on a distributed processing platform system.

BACKGROUND

Various distributed processing platforms provide a plurality of processing devices which can perform a distributed task in parallel batches or portions. Examples of distributed processing platforms include the Google App Engine, Amazon Web Services, cloud service platforms, or other suitable software service platforms. Distributed processing platforms generally distribute a task across many processing devices that individually do not have a significant amount of processing performance, but are effective when the task is distributed across hundreds or even thousands of the processing devices. However, a number of processors on which a task is to be performed often cannot be determined prior to performing a portion of the task. Additionally, as the number of processing devices is increased, it becomes more difficult to manage the results of the distributed task and determine when the task has been completed. In some scenarios, multiple processing devices finish respective portions of the distributed task at nearly a same time and attempt to write results to generally a same data storage device, which can cause contention issues and delay completion of the task.

BRIEF DESCRIPTION OF THE SEVERAL VIEWS OF THE DRAWINGS

While the appended claims set forth the features of the present techniques with particularity, these techniques, together with their objects and advantages, may be best understood from the following detailed description taken in conjunction with the accompanying drawings of which:

FIGS. 5A, 5B, 5C, 5D, 5E, 5F, 5G, and 5H are diagrams illustrating contents of a task queue and memory during performance of a method for distributing work within the distributed computing system of FIG. 1, according to an embodiment;

DETAILED DESCRIPTION

Figure 1A:
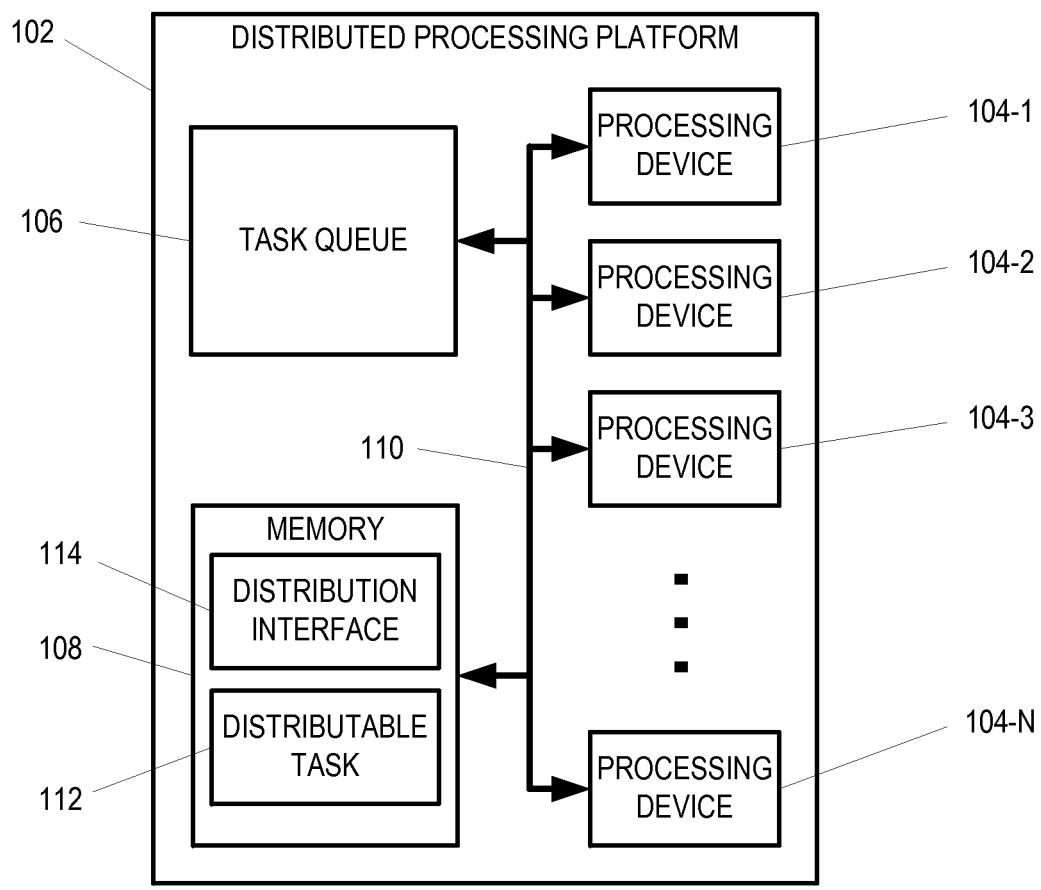
FIG. 1A is a block diagram illustrating a distributed computing system, according to an embodiment.

Turning to the drawings, wherein like reference numerals refer to like elements, techniques of the present disclosure are illustrated as being implemented in a suitable environment. The following description is based on embodiments of the claims and should not be taken as limiting the claims with regard to alternative embodiments that are not explicitly described herein.

In various embodiments, a node tree is used for distribution of work tasks across a distributed processing platform. Node identifiers for the nodes, which correspond to the work tasks, are determined based on a hash function and one or more variables. The variables are selected such that the node identifiers for the node tree are repeatedly determinable by using same input values for the variables, even on different processing devices at different times, without performing a lookup to an external data source. In some embodiments, the node identifiers can be determined by recursively performing the hash function, which allows for more efficient traversal of a node tree having a known or sufficiently predictable number of levels. In some embodiments, the amount of work provided to a work task is determined based on a completed portion of a parent work task. For example, a remainder portion of a work task is divided into a suitable number of child tasks based on the completed portion.

The present disclosure describes methods and devices that provide improved distributed processing by using a node tree. According to various embodiments, a method for traversing a node tree having a parent node and a hierarchy of child nodes to a selected child node of the hierarchy of child nodes is provided. The method includes determining a node identifier of a root node of the node tree by performing a hash function with at least a seed value for the node tree, each child node of the hierarchy of child nodes having a respective node identifier determined by performing the hash function with i) the seed value for the node tree, ii) the node identifier of a parent node of the selected child node, and iii) a child index of the parent node for the selected child node. The method also includes determining a node identifier of the selected child node by performing the hash function with i) the seed value for the node tree, ii) a node identifier of a parent node of the selected child node, and iii) the child index of the parent node for the selected child node. The method also includes causing a retrieval of data stored at a location indicated by the node identifier of the selected child node.

Turning to FIG. 1A, a distributed processing platform 102 includes a plurality of processing devices 104-1, 104-2, . . . 104-N (collectively referred to herein as "processing devices 104"), a task queue 106, a memory 108, and a network 110, according to an embodiment. In some embodiments, the distributed processing platform 102 includes the Google App Engine, Amazon Web Services, a cloud service or computing platform, or other suitable software service platform configured to perform a plurality of tasks received from one or more service subscribers. In other embodiments, the distributed processing platform 102 is a dedicated processing platform configured for performing one or more distributable tasks. In some scenarios, the distributed processing platform 102 also performs non-distributable tasks, management tasks for the distributed processing platform 102, or other suitable tasks. In various embodiments, the processing devices 104 comprise one or more of hardware processors, personal computers (PC), servers, clusters, or other suitable hardware processing device. In some embodiments, the processing devices 104 are managed virtual machines which are executed on one or more hardware processing devices.

Figure 1B:
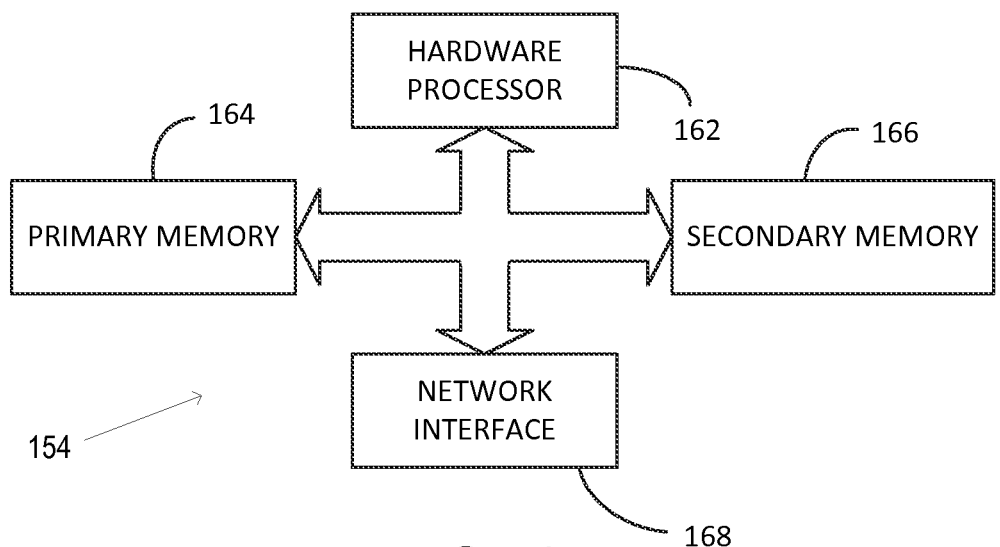
FIG. 1B is a block diagram illustrating a processing device of the distributed computing system of FIG. 1A, according to an embodiment.

Turning to FIG. 1B, a processing device 154 includes a hardware processor 162, a primary memory 164 (e.g., volatile memory, random-access memory), a secondary memory 166 (e.g., non-volatile memory, hard disk memory, solid state disk memory), and a network interface 168, according to an embodiment. The processing device 154 is a possible implementation of the processing device 104 of the distributed processing platform 102, but other implementations may be used and, in some embodiments, the plurality of processing devices 104 includes processing devices having different implementations. The processing device 154 in general and the hardware processor 162 in particular are able to communicate with other components of the distributed processing platform 102 (e.g., the task queue 106, memory 108, and/or other processing devices 104) via the network interface 168 over the network 110.

The memories 108, 164, and 166 store instructions and/or data. The hardware processor 162 executes the instructions and uses the data to carry out various procedures including, in some embodiments, the methods described herein. In various embodiments, the instructions stored in the memories 108, 164, or 166 include all of or a portion of a distributable task 112. The distributed processing platform 102 executes or performs the distributable task 112 and cooperates with the processing devices 104 to carry out one or more portions or steps of the methods described herein.

Although only a single distributable task 112 is illustrated for clarity, a plurality of tasks, including the distributable task 112 and other suitable tasks, are performed by the distributed processing platform 102, in various embodiments and/or scenarios. The distributed processing platform 102 divides the distributable task 112 into a set of work sub-tasks. In some embodiments, the distributable task 112 is a software module that includes procedures for dividing itself up into the set of work sub-tasks. In other embodiments, the distributed processing platform 102 provides a distribution interface 114 (e.g., an application programming interface) that divides the distributable task 112 into the set of work sub-tasks.

As described herein, a task represents a procedure, process, thread, function call, logic flow, or other unit of work which can be performed by a set of processing devices 104 of the distributed processing platform 102, and a sub-task is both a task and a portion of another task. For example, a task is a "parent" when it includes procedures that are divided into "child" tasks or sub-tasks. In some scenarios, a sub-task can be further divided into additional levels of sub-tasks (e.g., grandchildren of the parent task) with multiple levels of division in suitable scenarios (e.g., 2 levels, 5 levels, 50 levels, or another suitable value). In some embodiments, the number of levels of division is not determined in advance, but instead the distributed processing platform 102 determines additional divisions as needed, based on available resources (e.g., as processing devices 104 become available), or other suitable criteria.

In some embodiments, the work tasks are performed to validate cells of a table. In one such embodiment, a process is performed on each cell of the table. In this embodiment, tasks are distributed based on a range of cells, for example, in a 100 cell table, 25 cells are distributed into each of four sub-tasks. Each cell can have different values, complex equations, references to other cells, or other elements that make the processing device workload (i.e., processing time or a number of instructions) needed to perform the validation variable between the sub-tasks.

The distributed processing platform 102 places tasks (and sub-tasks) to be performed by the distributed processing platform 102 in the task queue 106. Examples of the task queue include a Google task queue, operating system queue, or other suitable queue. The task queue 106 can be stored in the memory 108, in a dedicated processing device 104, or in multiple (e.g., redundant) processing devices 104, in various embodiments. In an embodiment, the task queue 106 is a first in, first out (FIFO) queue. For example, a parent task for the distributable task 112 is placed in the task queue 106 and, during performance of the parent task, a set of child tasks are placed in the task queue 106 for subsequent performance by the distributed processing platform 102 after completion of the parent task and, where applicable, other unrelated tasks. In some scenarios, a child task of a parent task is performed simultaneously with the parent task on different processing devices 104.

In other embodiments, the task queue 106 is a priority queue and provides different quality of service levels or priority levels to some tasks. For example, a parent task or management task may be associated with an identifier or priority flag that provides faster advancement through the task queue 106. As another example, work tasks are provided with a higher priority than monitor tasks, effectively reducing a number of times that a monitor task is performed in some scenarios. In some embodiments, the task queue 106 includes multiple queues corresponding to the different priority levels. In still other embodiments, the task queue 106 is a last in, first out (LIFO) queue. In one such embodiment, monitor tasks are inserted into the LIFO queue before sub-tasks are inserted into the LIFO queue, allowing the hierarchy to "unwind" from sub-tasks to the parent task. In an embodiment, a plurality of LIFO queues are used in parallel. For example, each child task (and its sub-tasks) from a root node of the node tree are allocated a separate LIFO queue.

Monitoring of the completion status of the parent and child tasks is performed by one or more monitor tasks, in various embodiments. Generally, a task stores one or more of task results, status information, and node tree information in a task marker. A task marker is a data structure stored at an addressable location which is identified by a node identifier. Examples of a task marker include database entries, files, memory portions, or other suitable data or content containers. When a task is completed, the task stores or updates a task marker with results of the task. In some scenarios, a processing device 104 reaches a processing device performance threshold and stops performing the task before the task has completed. When the task is to be interrupted or stopped before completion, the task stores a task marker, creates one or more child tasks (e.g., sub-tasks) to finish a remainder of the work for the task, and creates a monitor task, as described herein. The monitor task checks for completion of the child tasks and updates the task marker for the parent, allowing the parent task to be discontinued or terminated (i.e., exiting and releasing the processing device 104 for other tasks instead of simply going to sleep or waiting). In some embodiments, the monitor task is placed in the task queue 106 after the child tasks, allowing each child task to be performed or started prior to a start of the monitor task and reducing a number of "status checks" that are performed.

The processing device performance thresholds promote sharing of the processing device 104 with other tasks and reduce occurrences of a task monopolizing a processing device 104. In some examples, the processing device performance threshold is a memory usage threshold. For example, the processing device 104 stops performing a task when the task has used 512 megabytes of the memory 164 or one gigabyte of the memory 166. In some examples, the processing device performance threshold is a processor usage threshold. For example, the processing device 104 stops performing a task when the task has used ten seconds of processing time or performed a selected number of processing operations. In some examples, the processing device performance threshold is an interrupt threshold. For example, the processing device 104 stops performing a task when the processing device 104 has received a selected number of processing device interrupt signals (e.g., processor requests, hardware failure notices, or other suitable interrupt signals). The selected number of processing device interrupt signals can be one, two, or more, in various embodiments. In some embodiments, each processing device 104 of the distributed processing platform 102 has a same processing device performance threshold used to interrupt the tasks. In other embodiments, the processing devices 104 have different processing device performance thresholds. In another embodiment, the distributed processing platform 102 sets and provides the processing device performance thresholds to the tasks as they are performed (e.g., dynamically) by the processing device 104. In yet another embodiment, the distributed task 112 includes the processing device performance thresholds which are passed to the sub-tasks. In an embodiment, the task dynamically selects a processing device performance threshold for a set of processing devices having substantially the same processing performance.

The task markers and tasks of the distributable task 112 are identified by and related to each other by node identifiers that correspond to a node tree. The task tree information includes sufficient information for a monitor task to obtain the task markers for each node of the node tree. In various embodiments, each node of a node tree has a node identifier determined by performing a function with one or more variables (e.g., a hash function) to generate the node identifier. In other embodiments, a random or pseudo-random number is generated as the node identifier. In an embodiment using the hash function, each node corresponds to a node identifier determined by performing the hash function with a seed value for the node tree, a node identifier of a parent node for the node, and a child index of the node. In some scenarios, the seed value is a randomly or pseudo-randomly generated value. In other scenarios, the seed value is based on a job identifier, application name, device name, or other suitable value. For a new distributable task, the root node corresponds to a node identifier determined by performing the hash function of the seed value of the node tree, a null parent indicator, and a null child indicator. The null parent indicator and null child indicator represent suitable values to indicate that no parent exists and that no other root nodes have been previously created for the task. Examples for the null parent indicator include a value of zero or the same value as the seed value. Examples for the null child indicator include a value of zero, a maximum allowable value, or a preselected integer value (e.g., 0xFFFF for a 16-bit integer).

Each child node that is directly descendant from the root node has a node identifier determined as the hash function of the seed value of the node tree, the node identifier of the root node, and a respective child index. The child index is an integer index of the child nodes. For example, where the root node has five child nodes, the child index is an integer from 0 to 4 (or, alternatively, from 1 to 5 or another suitable range). By using the same hash function when determining node identifiers for the root nodes and child nodes, the entire node tree can be reproduced around a given node by recursively performing the hash function with the seed value, determined node identifiers, and various values of the child index. In some embodiments, the node identifier is a universally unique identifier (UUID). The node identifier need not be perfectly unique, only sufficiently unique to provide at least an acceptable risk of a duplicate node identifier occurring. In some embodiments, the output of a function is modified, punctured, truncated, or has additional bits added to obtain the node identifier.

In some embodiments, the hash function is one of an MD2 Message-Digest Algorithm (Internet Engineering Task Force RFC 1319; https://www.ietf.org), MD5 Message-Digest Algorithm (Internet Engineering Task Force RFC 1321; https://www.ietf.org), or other suitable hash function that provides an output having a length of 128 bits corresponding to a UUID which also has a length of 128 bits. In other embodiments, the hash function is one of SHA-1 (Federal Information Processing Standards Publication 180-4; http://csrc.nist.gov/publications/fips/fips180-4/fips-180-4.pdf), SHA-2 (See U.S. Pat. No. 6,829,355), SHA-3 (draft Federal Information Processing Standards Publication 202; http://csrc.nist.gov/publications/drafts/fips-202/fips_202_draft.pdf) or other suitable hash function that provides an output having a length greater than 128 bits. In one such embodiment, a subset of the output is selected for the UUID (e.g., omitting the last 32 bits of a 160 bit hash output) or the output is further modified, punctured, truncated, etc. In some embodiments, the node identifier has a length equal to a native output length of the hash function (e.g., 160 bits, 224 bits, 256 bits, 512 bits, or other suitable lengths).

Figure 2:
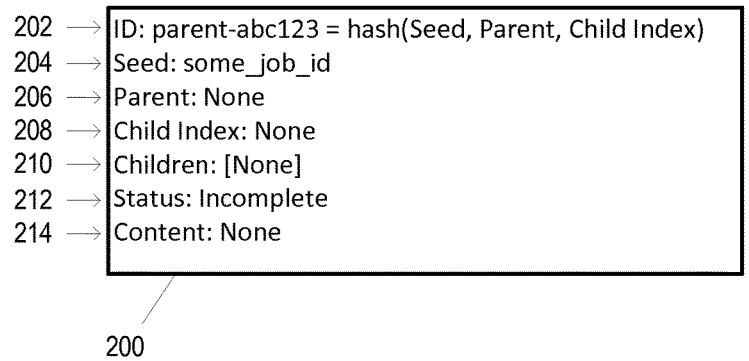
FIG. 2 is a diagram illustrating a marker corresponding to a node of a node tree, according to an embodiment.

Turning to FIG. 2, a task marker 200 corresponding to a node of a node tree includes a node identifier 202, a seed value 204 for the node tree, a node identifier 206 of a parent node, a child index 208, one or more child indicators 210, a progress status 212, and content 214, according to an embodiment. The node identifier 202, seed value 204, node identifier 206, child index 208, and child indicators 210 provide node tree information, the content 214 provides task results, and the progress status 212 provides status information for the task (e.g., incomplete or complete). In the illustrated embodiment, the node identifier 202 ("parent-abc123" for simplicity and clarity) is determined by performing a hash function with the seed value 204, the node identifier 206 of the parent node, and the child index 208 where the node identifier 206 and the child index have null indicators to indicate a root node, as described above.

The child indicator 210 provides a reference to child tasks created by the task to finish the remainder of work for the task, as described above. In some embodiments, the child indicator 210 is an array having an entry for each child task. As one example, the entry includes a status indicator that indicates whether the child task has completed, a content flag that indicates whether the child task has completed content associated with it, and a child count indicator that indicates a number of child tasks that have been created by the child task (e.g., grand-children from the current node). In other examples, the child indicator 210 includes the child count indicator and omits the status indicator and content flag.

In some embodiments, the task marker 200 does not include the node identifiers for each of its child tasks. This approach reduces the memory footprint of the distributable task 112 in that only two UUIDs and an integer value (e.g., child count indicator) is needed to determine the UUIDs of each child. For example, the task marker for a parent task having 50 child tasks does not store a separate 128-bit UUID for each of the 50 children (128*50=6400 bits total), but instead stores only the seed value, the parent node identifier, and an integer ("50" in this example). The seed value, parent node identifier, and the child index (e.g., an incremental value from 0 to 49) can then be used to locally determine the UUIDs of each of the 50 child tasks using the hash function without performing a lookup external to the processing device that performs the hash function.

Figure 3:
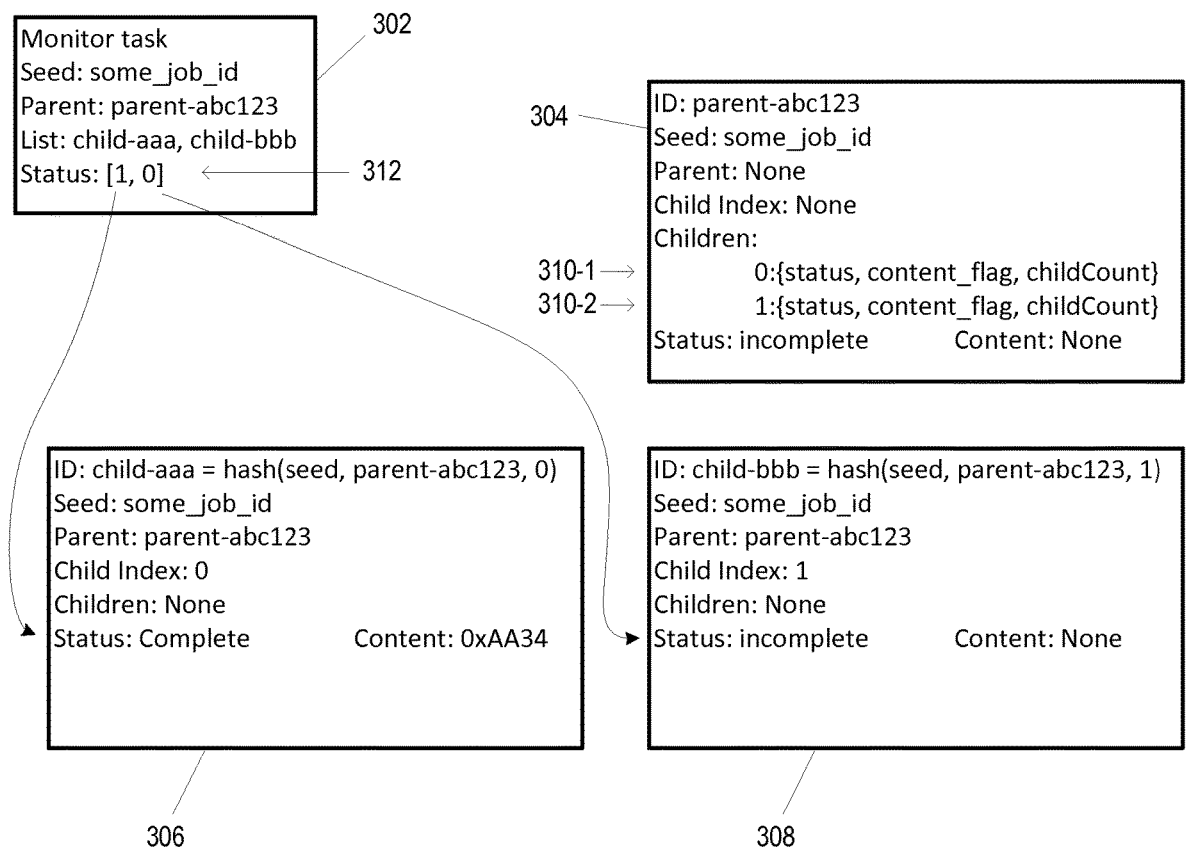
FIG. 3 is a diagram illustrating a root node and two child nodes with respective markers and a monitor task, according to an embodiment.

Turning to FIG. 3, work tasks corresponding to a root node and two child nodes with respective task markers 304, 306, and 308 and a monitor task 302 are shown, according to an embodiment. In the illustrated embodiment, a root or parent task identified by node identifier "parent-abc123" is performed for a distributable task by a processing device 104 and does not complete before a processing device performance threshold for the processing device 104 is met. The parent task creates a first sub-task or child task identified by node identifier "child-aaa," which is determined by performing the hash function with the seed value ("some_job_id"), the node identifier of the parent node ("parent-abc123"), and a child index ("0"). The first child task corresponds to the task marker 306. The parent task also creates a second sub-task or child task identified by node identifier "child-bbb," which is determined by performing the hash function with the seed value ("some_job_id"), the node identifier of the parent node ("parent-abc123"), and a child index ("1"). The second child task corresponds to the task marker 308. The parent task also creates the monitor task 302.

The monitor task 302 is configured to monitor the child tasks (child-aaa and child-bbb) to determine when each has completed and/or has content or results available. In some embodiments, the monitor task 302 uses information stored within itself or passed as parameters to determine the completion status. In some embodiments, the monitor task 302 causes the task marker 304 to be retrieved (e.g., using a remote procedure call or other suitable method) and uses information stored in the task marker 304 to determine the completion status.

In the embodiment shown in FIG. 3, the task marker 304 includes a child indicator 310 having first and second entries 310-1 and 310-2 which correspond to the first child task ("child-aaa") and second child task ("child-bbb"). As described above with respect to FIG. 2, the entries 310-1 and 310-2 each include a status indicator, a content flag, and a child count indicator. The task monitor 302 also includes a status indicator 312 that indicates a completion status of the child tasks, for example, an array of integers or bits. In the example shown in FIG. 3, the status indicator 312 includes a first bit ("1"), indicating that the first child ("child-aaa") is complete, and a second bit ("0"), indicating that the second child ("child-bbb") is incomplete. In various embodiments, the child indicator 210, the child indicator 310, and the status indicator 312 are used alone or in combination (e.g., to provide redundancy or improve processing speed). In the embodiment shown, the first child task is complete but the second child task is incomplete when the monitor task 302 is first performed. In this scenario, the monitor task updates the child indicator 310 and/or the status indicator 312 and then causes a second instance of the task monitor 302 to be performed at a later time. As one example, the first instance of the task monitor 302 adds the second instance to the task queue 106 and then the first instance is discontinued or terminated. Generally, placing the second instance in the task queue 106 allows the incomplete child tasks to finish or to create further sub-tasks and reduces a number of "status checks" that are performed by the monitor task 302.

While only two child tasks are shown in FIG. 3, in some embodiments a work task may create a large number of sub-tasks (e.g., 50, 400, 20,000, or another suitable number). In an embodiment, the corresponding monitor task checks only a subset of the child tasks during its performance. For example, the monitor task determines the node identifiers using the hash function for a predetermined number of child tasks (e.g., 5, 10, or another suitable number), updates the progress status as needed, then places a subsequent instance of the task monitor into the task queue 106. In an embodiment, the monitor task randomizes the node identifiers which are checked by randomly or pseudo-randomly selecting a child index when performing the hash function.

Figure 4:
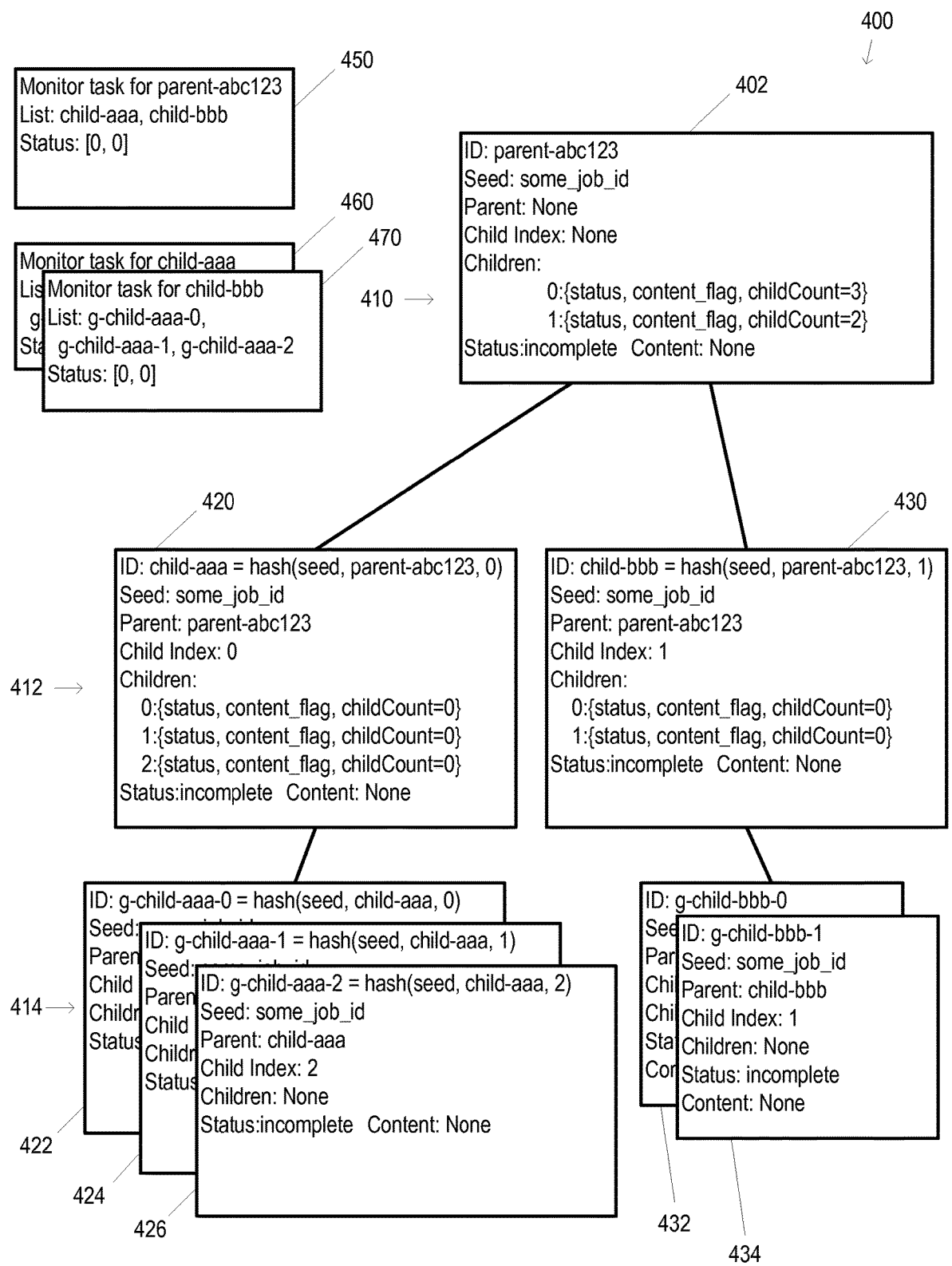
FIG. 4 is a diagram illustrating a node tree and corresponding monitor tasks, according to an embodiment.
Figure 5A:
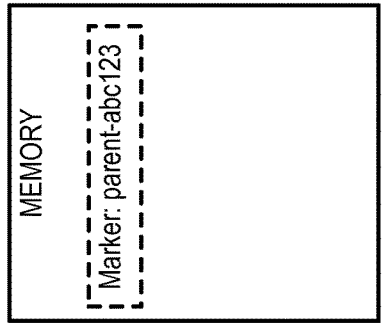
Figure 5B:
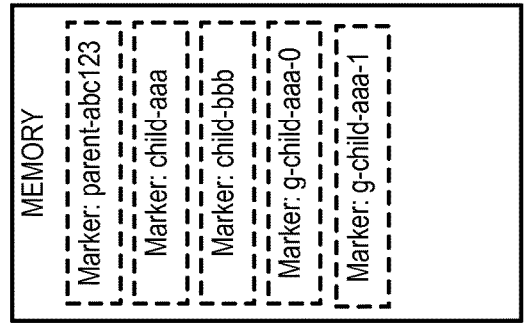
Figure 5C:
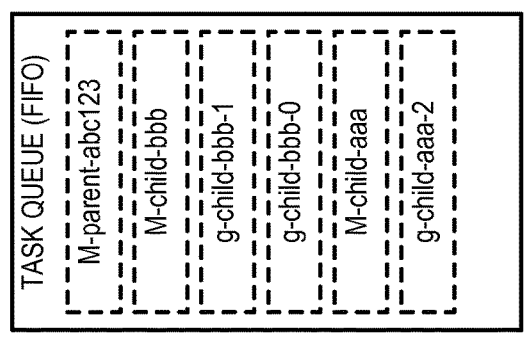
Figure 5D:
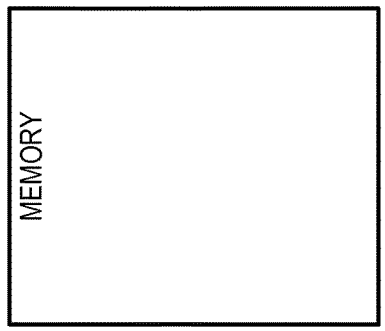
Figure 5D:
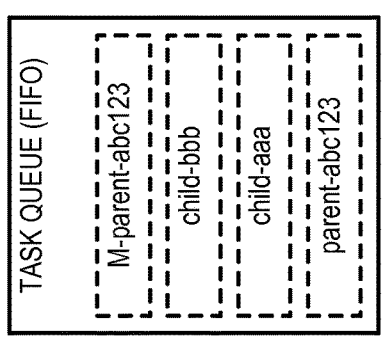

FIG. 4 is a diagram illustrating a node tree 400 and corresponding monitor tasks 450, 460, and 470, according to an embodiment. The node tree 400 includes nodes which correspond to tasks and task markers for a distributable task. The node tree 400 includes a parent or root node 402, which creates (e.g., via the corresponding task) a child node 420 ("child-aaa"), a child node 430 ("child-bbb"), and a task monitor 450 for monitoring the child nodes 420 and 430. The parent node 402 represents a first level 410 of the node tree 400. The child nodes 420 and 430 represent a second level 412 of the node tree 400.

The child node 420 creates a grandchild node 422 ("g-child-aaa-0"), a grandchild node 424 ("g-child-aaa-1"), a grandchild node 426 ("g-child-aaa-2"), and a task monitor 460 for monitoring the grandchild nodes 422, 424, and 426. The child node 430 creates a grandchild node 432 ("g-child-bbb-0"), a grandchild node 434 ("g-child-bbb-1"), and a task monitor 470 for monitoring the grandchild nodes 432 and 434. The grandchild nodes 422, 424, 426, 432, and 434 represent a third level 414 of the node tree 400. In the illustrated embodiment, each task marker and monitor task is similar to the task markers and monitor tasks as described above with respect to FIG. 2 and FIG. 3.

Turning to FIGS. 5A, 5B, 5C, 5D, 5E, 5F, 5G, and 5H, diagrams 500, 510, 520, 530, 540, 560, and 570 illustrate contents of a task queue 506 and memory 508 at various chronological times during performance of a method for distributing a task within a distributed computing system, according to an embodiment. In the illustrated embodiment, the task queue 506 and memory 508 correspond to the task queue 106 and memory 108 as described in FIG. 1 and the contents correspond to the node tree 400 and monitor tasks 450, 460, and 470 as described in FIG. 4. The task queue 506 shows a plurality of tasks 502 that are queued for processing devices, such as the processing devices 104. For clarity, only a single task 504 at the bottom of the task queue 506 is performed at a time by the processing devices 104 (i.e., new tasks are placed on top of the task queue 506). Other unrelated tasks (e.g., management tasks or other distributable tasks), which may appear between the illustrated tasks and also use the processing devices 104, are not discussed or illustrated.

Diagram 500 illustrates a first time at which the parent task parent-abc123 is being performed, the child tasks child-aaa and child-bbb have been added to the task queue 506, and the monitor task 450 ("M-parent-abc123") has been added to the task queue 506. Diagram 510 illustrates a second time at which the child task child-aaa is performed and the parent task parent-abc123 has exited. Prior to exiting, the parent task parent-abc123 stores the corresponding task marker 402 ("Marker: parent-abc123") in the memory 508.

Diagram 520 illustrates a third time at which the child task child-bbb is being performed. At the third time, the child task child-aaa has previously been interrupted by an occurrence of a processing device performance threshold and, in response to the interrupt, the child task child-aaa creates three new grandchild tasks. In an embodiment, the child task child-aaa determines a completed portion and a remainder portion, for example, in response to the interrupt. The completed portion represents a processing device workload which the processing device 104 (or set of processing devices 104) was able to complete prior to the interrupt. The child task child-aaa determines a number of grandchild tasks to be created based on the processing device workload. In an embodiment, the number of grandchild tasks is determined to be equal to at least the remainder portion divided by the completed portion, which may reduce the number of subsequent descendant tasks that are created. For example, where the child task is provided with 100 database lookups to be performed and completes only 25 database lookups before the interrupt, the remainder of 75 database lookups is divided into three grandchild tasks. In other embodiments, the child task child-aaa uses a scaling factor to increase the number of grandchild tasks. For example, a scaling factor of 0.8 times the 25 completed database lookups results in a scaled processing device workload of 20, resulting in the distribution of the 75 remaining lookups to four grandchild tasks. The scaling factor provides a margin of error to reduce the occurrences of i) re-distributing tasks and ii) increasing levels and complexity of the node tree.

In response to the interrupt, the child task child-aaa creates and adds to the task queue 506 three grandchild tasks g-child-aaa-0, g-child-aaa-1, g-child-aaa-2 based on the completed portion and remainder portion, as described above. Prior to exiting, the child task child-aaa creates and adds to the task queue 506 the monitor task 460 ("M-child-aaa") and also stores the task marker 420 ("Marker: child-aaa") in the memory 508. The grandchild tasks appear in the task queue 506 before the monitor task, allowing the child tasks to at least start execution and in some scenarios finish execution prior to a start of the monitor task.

Diagram 530 illustrates a fourth time at which the grandchild task g-child-aaa-2 is being performed. At the fourth time, the child task child-bbb has i) been interrupted, ii) stored the task marker 430 ("Marker: child-bbb"), created grandchild tasks g-child-bbb-0 and g-child-bbb-1 based on the completed portion, and created the monitor task 470 ("M-child-bbb"). Also at the fourth time, the grandchild tasks g-child-aaa-0 and g-child-aaa-1 have completed and stored the task markers 422 and 424 ("Marker: g-child-aaa-0" and "Marker: g-child-aaa-1"). Also at the fourth time, the monitor task 450 ("M-parent-abc123") has been performed once, determined that both child tasks child-aaa and child-bbb have not yet completed, and created a second instance of the monitor task 450 at the top of the task queue 506.

Diagram 540 illustrates a fifth time at which the monitor task 460 ("M-child-aaa") is being performed. At the fifth time, grandchild task g-child-aaa-2 has completed and stored the task marker 426 ("Marker: g-child-aaa-2"). At the fifth time, the monitor task 460 ("M-child-aaa") attempts to retrieve the task markers 422, 424, and 426 corresponding to grandchild tasks g-child-aaa-0, g-child-aaa-1, g-child-aaa-2. The monitor task 460 determines whether each grandchild task has completed, for example, based on the progress status 212 of the task markers 422, 424, and 426. In an embodiment, the monitor task 460 updates the child indicator 210 and progress status 212 of the task marker 420 to indicate completion of the grandchild tasks of the child task child-aaa and also the completion of the child task child-aaa. If the task marker has not been retrieved or the progress status 212 indicates the task is incomplete, the monitor task 460 creates a new instance on top of the task queue 506. In some embodiments, if the task marker has not been retrieved, the monitor task 460 searches the task queue 506 to determine whether the task is still pending in the task queue 506.

In some embodiments, the monitor task 460 also combines or "reduces" content 214 corresponding to the grandchild tasks into the content 214 of the child task child-aaa. In other embodiments, the monitor tasks create a new work task to perform the reduction of results from completed tasks. Reducing the content reduces the number of nodes or task markers that must be retrieved in order to obtain the results of the distributed task. Diagram 550 illustrates a sixth time at which the content 214 of the task markers 422, 424, and 426 is combined into the task marker 420 and updates the progress status 212 to "Complete" ("Marker: child-aaa"). In some embodiments, the monitor task 460 updates the task marker 420 to remove references to the grandchild tasks which have been combined and frees resources used by the corresponding task markers. In an embodiment, the monitor tasks begin a reduce task after a predetermined number of work tasks have completed. In another embodiment, the parent monitor task starts a predetermined number of reduce tasks (e.g., two, three, ten, or another suitable number) where each reduce task incrementally reduces results collected from the work tasks. In other embodiments, the child task g-child-aaa has not yet completed or creates great grandchildren, so that the task marker child-aaa is not fully complete. In one such embodiment, the monitor task 460 combines the completed markers for child-aaa into the parent marker and re-inserts itself in the task queue 506. In another embodiment, the monitor task 460 leaves each child marker in place until they are all completed.

Diagram 560 illustrates a seventh time at which the monitor task 450 ("M-parent-abc123") is being performed. At the seventh time, the grandchild tasks g-child-bbb-0 and g-child-bbb-1 have completed and the corresponding task markers have been combined ("Marker: child-bbb Complete"). The monitor task 450 determines that each child of the parent task parent-abc123 has completed, as described above, and combines the corresponding task markers ("Marker: child-aaa Complete" and "Marker: child-bbb Complete") into the task marker of the parent node ("Marker: parent-abc123 Complete"), as shown in Diagram 570.

In some embodiments, a monitor task, management task, or other suitable task traverses the node tree 400 by predicting or determining multiple the node identifiers for nodes that are multiple levels deeper than a current level. For example, the monitor task 450 can determine the node identifier for the grandchild node g-child-aaa-0 by performing the hash function a first time with the seed, parent node identifier ("parent-abc123"), and a child index of 0 to determine the node identifier of the first child. The monitor task 450 can then determine the node identifier for the grandchild node g-child-aaa-0 by performing the hash function a second time with the seed, the node identifier of the first child, and a child index of 0. In some embodiments, the monitor task 450 recursively determines a respective node identifier of at least one intermediate node (e.g., similar to the child-aaa node in the previous example), between the root node and a selected child or descendant node, by performing the hash function with i) the seed value for the node tree, ii) the node identifier of a parent node of the intermediate node, and iii) a respective child index of the parent node for the intermediate node. The monitor task 450 then determines the node identifier of the selected child node by performing the hash function with i) the seed value for the node tree, ii) the node identifier of a last intermediate node of the at least one intermediate node, and iii) a child index of the last intermediate node for the selected child node, where the last intermediate node of the at least one intermediate node is the parent node of the selected child node. In some scenarios, the monitor task can "jump" down three, four, ten, or any suitable number of levels by recursively performing the hash function with suitable values. Advantageously, the node identifiers are determined locally without performing a lookup to an external database or data store.

In the illustrated embodiment of FIG. 4, a monitor task has been created for each node that creates a child node. In another embodiment, a single monitor task is used for each level of the node tree 400. For example, the monitor task 460 is configured to monitor the grandchild nodes 422, 424, 426, 432, and 434. In this embodiment, the monitor task 460 stores the node identifier for the parent node ("parent-abc123"), the number of child nodes of the parent node, and the number of grandchild nodes for each child node.

In some scenarios, a remainder portion of a task is less than the completed portion or a further division of the remainder is undesirable. In some embodiments, a task continues processing on a current processing device even though the processing device performance threshold has been met. For example, the task ignores or disregards the processing device performance threshold. In an embodiment, a task continues processing when a remainder portion of the task is determined to be less than a completed portion of the task or the completed portion multiplied by a suitable scaling factor. In other embodiments, the task does not divide the remainder into further sub-tasks, but instead adds a new instance of the task (having a same node identifier as the original instance) to the task queue 106. In one such embodiment, the second instance of the task appends its result to the task marker using the node identifier.

Figure 6:
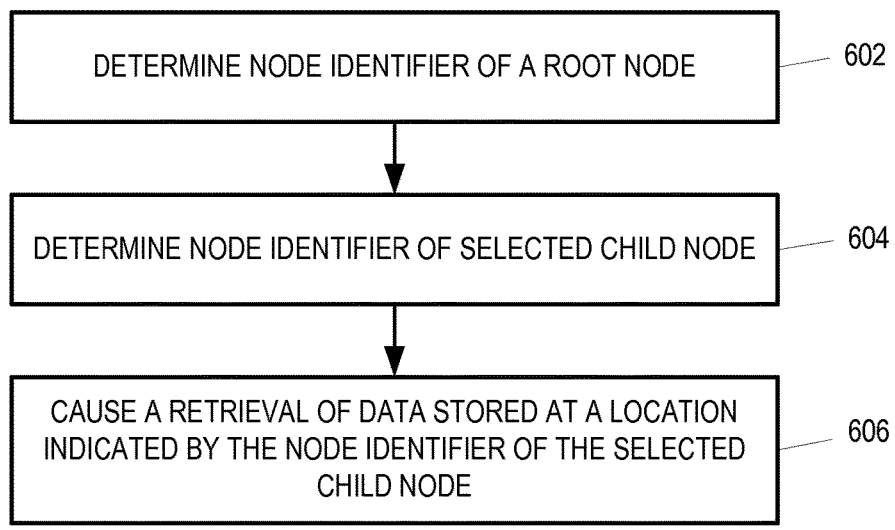
FIG. 6 is a flowchart illustrating a method for traversing a node tree, according to an embodiment.

FIG. 6 is a flowchart illustrating a method 600 for traversing a node tree (e.g., the node tree 400 of FIG. 4) having a root node and a hierarchy of child nodes to a selected child node of the hierarchy of child nodes, according to an embodiment. With reference to FIG. 1, the method 600 is implemented by one or more processing devices 104, in an embodiment. In other embodiments, the method 600 is implemented by other suitable components of the distributed processing platform 102. In some embodiments, the method 600 is performed as a portion of a monitor task, such as the monitor task 302, 450, 460, and/or 470.

At block 602, a node identifier of the root node of the node tree is determined by performing a hash function with at least a seed value for the node tree. Each child node of the hierarchy of child nodes has a respective node identifier determined by performing the hash function with i) the seed value for the node tree, ii) the node identifier of a parent node of the child node, and iii) a child index of the parent node for the child node. For example, the monitor task 450 determines the node identifier of the root node (e.g., task marker 402) by performing the hash function of the seed value ("some_job_id"), the null parent indicator, and the null child indicator, as described above with respect to FIG. 4.

In some embodiments, each node identifier of the node tree is determined by performing the hash function with different values and determining the node identifier of the root node includes performing the hash function with i) the seed value for the node tree, ii) a null parent indicator, and iii) a null child indicator. In an embodiment, performing the hash function generates a universally unique identifier (UUID) as the node identifier. In an embodiment, the hash function generates node identifiers that indicate physically distributed data storage locations for sub-task markers. In some embodiments, each node identifier of the node tree is determined by performing the hash function with different values without performing a lookup external to a processing device that performs the hash function.

At block 604, a node identifier of the selected child node is determined by performing the hash function with i) the seed value for the node tree, ii) a node identifier of a parent node of the selected child node, and iii) the child index of the parent node for the selected child node. For example, the monitor task 450 determines the node identifier of a selected child node (e.g., task marker 430) by performing the hash function of the seed value ("some_job_id"), the node identifier of the parent node ("parent-abc123"), and the child index ("1").

In some embodiments, determining the node identifier of the selected child node includes recursively determining a respective node identifier of at least one intermediate node, between the root node and the selected child node, by performing the hash function with i) the seed value for the node tree, ii) the node identifier of a parent node of the intermediate node, and iii) a respective child index of the parent node for the intermediate node, where a last intermediate node of the at least one intermediate node is the parent node of the selected child node, and determining the node identifier of the selected child node includes performing the hash function with i) the seed value for the node tree, ii) the node identifier of the last intermediate node of the at least one intermediate node, and iii) a child index of the last intermediate node for the selected child node. In an embodiment, determining the node identifier of the selected child node includes determining an integer value for a level of the selected child node within the hierarchy of child nodes and recursively determining the respective node identifiers for a number of intermediate nodes corresponding to the integer value for the level of the selected child node.

At block 606, a retrieval of data stored at a location indicated by the node identifier of the selected child node is caused. For example, the monitor task 450 sends a request to the memory 108 to obtain the task marker 430 at the location determined by the hash function.

In an embodiment, the method 600 optionally includes: storing a task marker, for a result of a distributable task, at a location indicated by the node identifier of the root node; and storing one or more sub-task markers, for respective results of one or more sub-tasks of the distributable task, at locations indicated by node identifiers of the hierarchy of child nodes, where each of the one or more sub-task markers corresponds to a respective node identifier of the hierarchy of child nodes. In an embodiment, the method 600 further includes causing each of the one or more sub-tasks of the distributable task to be performed by a respective set of processing devices of a distributed processing platform.

Figure 7:
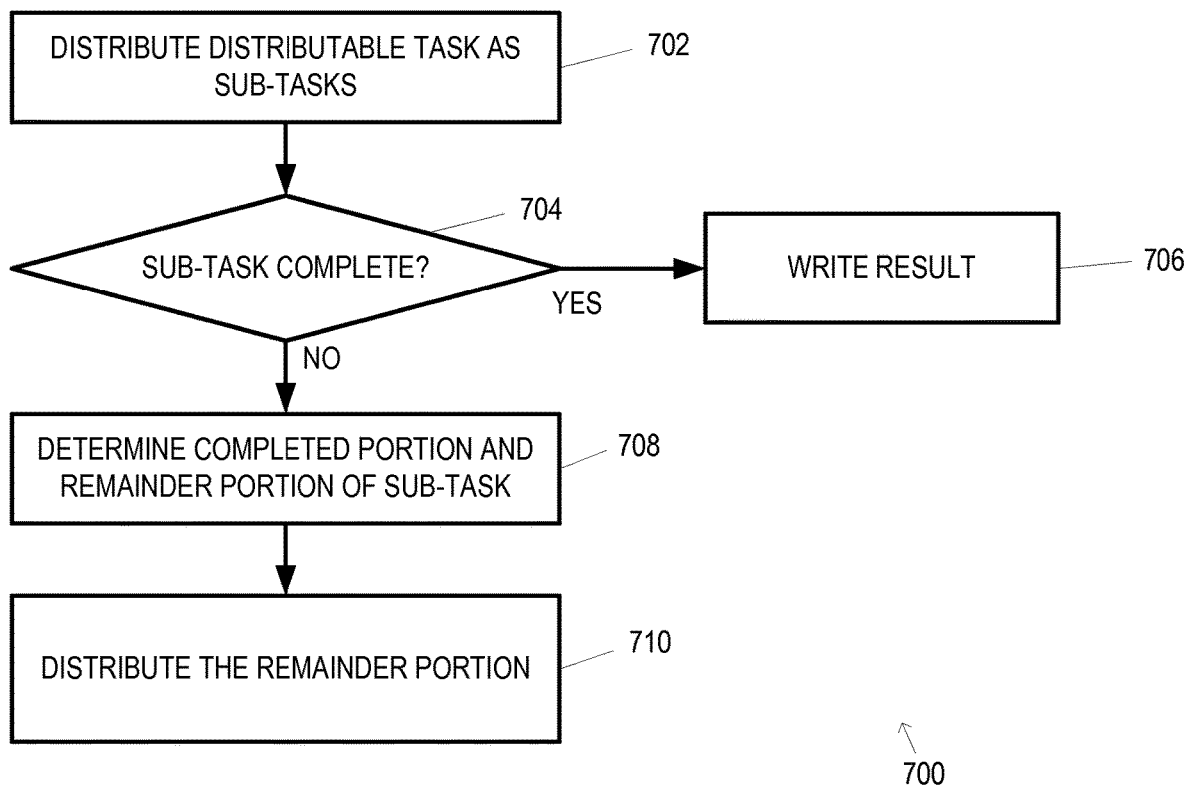
FIG. 7 is a flowchart illustrating a method for performing a distributable task on a plurality of processing devices of a distributed processing platform, according to an embodiment.

FIG. 7 is a flowchart illustrating a method 700 for performing a distributable task on a plurality of processing devices of a distributed processing platform, according to an embodiment. For example, the distributable task 112 is performed on the processing devices 104. With reference to FIG. 1, the method 700 is implemented by one or more processing devices 104, in an embodiment. In other embodiments, the method 700 is implemented by other suitable components of the distributed processing platform 102. In some embodiments, the method 700 is performed as a portion of a work task, such as the tasks corresponding to task markers 402, 420, 422, 424, 426, 430, 432, and/or 434.

At block 702, the distributable task is distributed as a first set of sub-tasks to be performed by at least some of the plurality of processing devices. The first set of sub-tasks has at least a first sub-task and a second sub-task. For example, the parent task corresponding to the task marker 402 is distributed as a first set of sub-tasks including the sub-tasks child-aaa and child-bbb, as described above with respect to FIG. 4.

At block 704, in response to reaching a processing device performance threshold for a first set of processing devices of the plurality of processing devices that perform the first sub-task, it is determined whether the first sub-task has been completed by the first set of processing devices. For example, the monitor task 450 determines whether the child task child-aaa has completed. If it is determined that the child task is complete, the method proceeds to block 706. If it is determined that the child task is not complete, the method proceeds to block 708.

At block 706, the results of the child task are optionally written to a parent task marker as part of a "reduce" function, as described above.

At block 708, a completed portion and a remainder portion of the first sub-task are determined. At block 710, the remainder portion is distributed as a second set of sub-tasks to be performed by at least some of the plurality of processing devices based on the completed portion. For example, the child task child-aaa determines the completed portion and remainder portion and creates the grandchild tasks g-child-aaa-0, g-child-aaa-1, and g-child-aaa-2, as described above with respect to FIG. 5.

In some embodiments, the processing device performance threshold includes one or more of a memory usage threshold, a processor usage threshold, or indicates a selected number of occurrences of a processing device interrupt signal. In an embodiment, the processing device performance threshold is dynamically selected for a set of processing devices of the plurality of processing devices where the set of processing devices have substantially the same processing performance. In an embodiment, each sub-task of the second set of sub-tasks corresponds to a processing device workload of the completed portion.

In an embodiment, the method 700 optionally includes storing one or more sub-task markers, for respective results of the first set of sub-tasks and the second set of sub-tasks, at locations indicated by node identifiers of a hierarchy of child nodes, where each of the one or more sub-task markers corresponds to a different node identifier of the hierarchy of child nodes. In an embodiment, the second set of sub-tasks includes a single sub-task having an estimated processing device workload that is less than a processing device workload of the completed portion of the first sub-task. In one such embodiment, the method 700 further includes: storing one or more sub-task markers, for respective results of the first set of sub-tasks, at locations indicated by node identifiers of a hierarchy of child nodes; and appending a result of the single sub-task of the second set of sub-tasks to the sub-task marker of the first sub-task.

Figure 8:
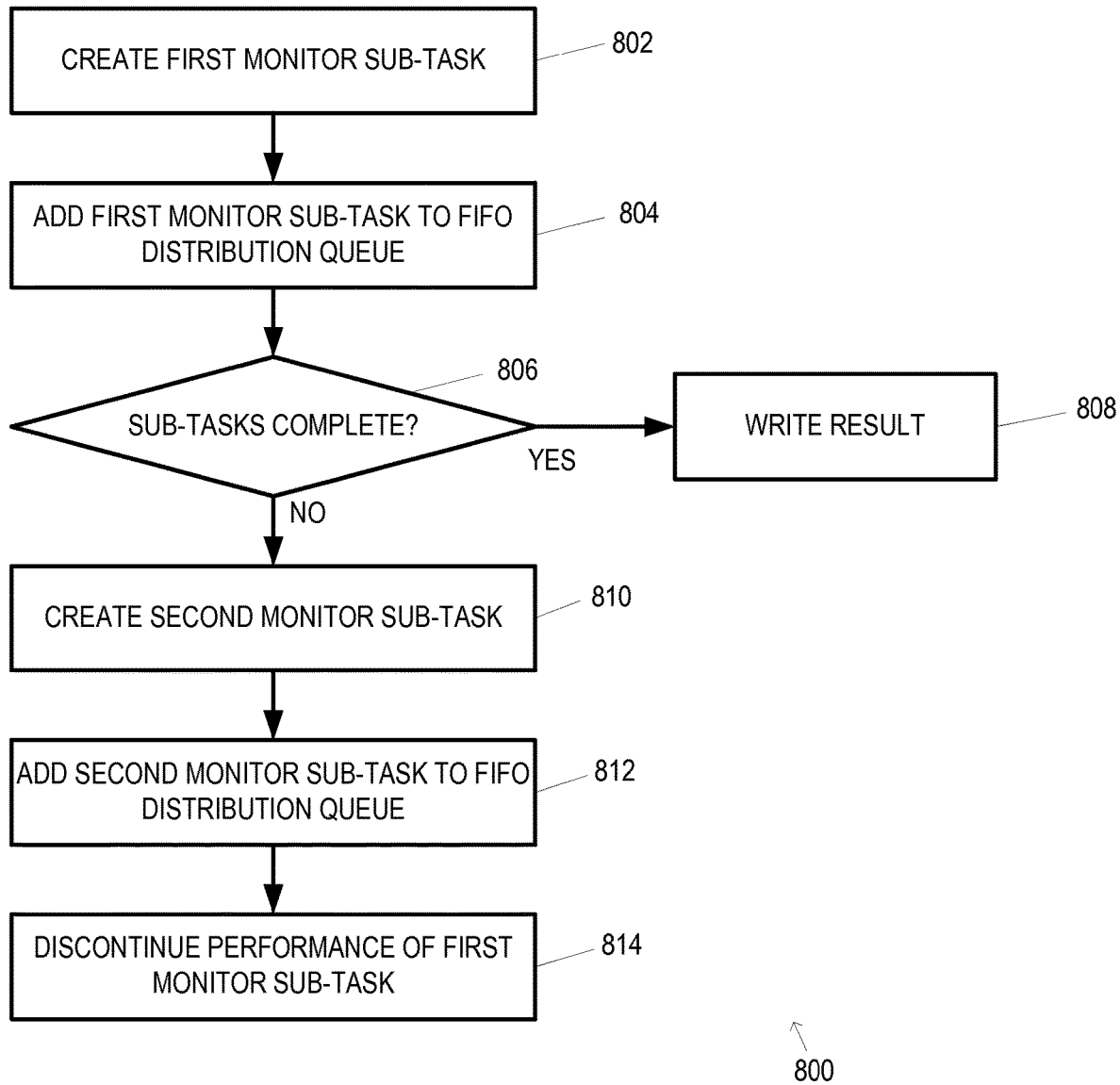
FIG. 8 is a flowchart illustrating a method for determining a completion status of a distributable task on a plurality of processing devices of a distributed processing platform, according to an embodiment.

FIG. 8 is a flowchart illustrating a method 800 for determining a completion status of a distributable task on a plurality of processing devices of a distributed processing platform, according to an embodiment. With reference to FIG. 1, the method 800 is implemented by one or more processing devices 104, in an embodiment. In other embodiments, the method 800 is implemented by other suitable components of the distributed processing platform 102. In some embodiments, the method 800 is performed as a portion of a monitor task, such as the monitor task 302, 450, 460, and/or 470. In some embodiments, the method 800 is performed as a portion of a work task, such as the tasks corresponding to task markers 402, 420, 422, 424, 426, 430, 432, and/or 434. In some embodiments, both monitor tasks and work tasks cooperate to perform the method 800.

At block 802, a first monitor sub-task is created for a first plurality of work sub-tasks which are i) divided from a distributable task and ii) added to a first in, first out (FIFO) distribution queue configured to distribute sub-tasks to be performed by the plurality of processing devices. For example, the work task corresponding to the task marker 402 creates the task monitor 450, as described above with respect to FIGS. 4 and 5.

At block 804, the first monitor sub-task is added to the FIFO distribution queue after the first plurality of work sub-tasks. For example, the work task adds the task monitor 450 ("M-parent-abc123") to the top of the task queue 506, as described above with respect to FIG. 5.

At block 806, upon performance of the first monitor sub-task, it is determined whether the first plurality of work sub-tasks has completed. For example, the monitor task 450 determines whether the child tasks child-aaa and child-bbb have completed. If it is determined that the child tasks are complete, the method proceeds to block 808. If it is determined that the child tasks are not complete, the method proceeds to block 810.

At block 808, the results of the child task are optionally written to a parent task marker as part of a "reduce" function, as described above.

At block 810, a second monitor sub-task is created for the first plurality of work sub-tasks. At block 812, the second monitor sub-task is added to the FIFO distribution queue. For example, a second instance of the monitor task 450 is created and added to the top of the task queue 506, as described above with respect to FIGS. 4 and 5.

At block 814, performance of the first monitor sub-task is discontinued. For example, the first instance of the monitor task 450 is discontinued and the corresponding resources are freed for use by other tasks.

In an embodiment, determining whether the first plurality of work sub-tasks has completed includes: determining whether each of the first plurality of work sub-tasks that is indicated as being incomplete by a status array has been completed, where the status array has a completion indicator for each of the first plurality of work sub-tasks; and upon a determination that a sub-task has completed, updating the corresponding completion indicator of the status array to indicate that the sub-task has completed. In an embodiment, determining whether each of the first plurality of work sub-tasks has been completed includes: determining a node identifier of a child node of a node tree by performing a hash function with i) a seed value for the node tree, ii) a node identifier of a parent node of the child node, and iii) a child index of the parent node for the child node, where each of the first plurality of work sub-tasks corresponds to a respective child node of the node tree; and causing a retrieval of data stored at a location indicated by the node identifier of the child node. In an embodiment, updating the corresponding completion indicator of the status array includes causing a retrieval of data stored at a location indicated by a node identifier of the parent node of the child node, wherein the data comprises the status array.

It can be seen from the foregoing that methods and systems for distribution of work tasks across a distributed processing platform have been described. In view of the many possible embodiments to which the principles of the present discussion may be applied, it should be recognized that the embodiments described herein with respect to the drawing figures are meant to be illustrative only and should not be taken as limiting the scope of the claims. Therefore, the techniques as described herein contemplate all such embodiments as may come within the scope of the following claims and equivalents thereof.

The apparatus described herein may include a processor, a memory for storing program data to be executed by the processor, a permanent storage such as a disk drive, a communications port for handling communications with external devices, and user interface devices, including a display, touch panel, keys, buttons, etc. When software modules are involved, these software modules may be stored as program instructions or computer readable code executable by the processor on a non-transitory computer-readable media such as magnetic storage media (e.g., magnetic tapes, hard disks, floppy disks), optical recording media (e.g., CD-ROMs, Digital Versatile Discs (DVDs), etc.), and solid state memory (e.g., random-access memory (RAM), read-only memory (ROM), static random-access memory (SRAM), electrically erasable programmable read-only memory (EEPROM), flash memory, thumb drives, etc.). The computer readable recording media may also be distributed over network coupled computer systems so that the computer readable code is stored and executed in a distributed fashion. This computer readable recording media may be read by the computer, stored in the memory, and executed by the processor.

The disclosed embodiments may be described in terms of functional block components and various processing steps. Such functional blocks may be realized by any number of hardware and/or software components configured to perform the specified functions. For example, the disclosed embodiments may employ various integrated circuit components, e.g., memory elements, processing elements, logic elements, look-up tables, and the like, which may carry out a variety of functions under the control of one or more microprocessors or other control devices. Similarly, where the elements of the disclosed embodiments are implemented using software programming or software elements, the disclosed embodiments may be implemented with any programming or scripting language such as C, C++, JAVA®, assembler, or the like, with the various algorithms being implemented with any combination of data structures, objects, processes, routines or other programming elements. Functional aspects may be implemented in algorithms that execute on one or more processors. Furthermore, the disclosed embodiments may employ any number of conventional techniques for electronics configuration, signal processing and/or control, data processing and the like. Finally, the steps of all methods described herein may be performed in any suitable order unless otherwise indicated herein or otherwise clearly contradicted by context.

For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. The words "mechanism", "element", "unit", "structure", "means", "device", "controller", and "construction" are used broadly and are not limited to mechanical or physical embodiments, but may include software routines in conjunction with processors, etc.

No item or component is essential to the practice of the disclosed embodiments unless the element is specifically described as "essential" or "critical". It will also be recognized that the terms "comprises," "comprising," "includes," "including," "has," and "having," as used herein, are specifically intended to be read as open-ended terms of art. The use of the terms "a" and "an" and "the" and similar referents in the context of describing the disclosed embodiments (especially in the context of the following claims) are to be construed to cover both the singular and the plural, unless the context clearly indicates otherwise. In addition, it should be understood that although the terms "first," "second," etc. may be used herein to describe various elements, these elements should not be limited by these terms, which are only used to distinguish one element from another. Furthermore, recitation of ranges of values herein are merely intended to serve as a shorthand method of referring individually to each separate value falling within the range, unless otherwise indicated herein, and each separate value is incorporated into the specification as if it were individually recited herein.

The use of any and all examples, or exemplary language (e.g., "such as") provided herein, is intended merely to better illuminate the disclosed embodiments and does not pose a limitation on the scope of the disclosed embodiments unless otherwise claimed. Numerous modifications and adaptations will be readily apparent to those of ordinary skill in this art.

We claim:

1. A method for performing a distributable task on a plurality of processing devices of a distributed processing platform, comprising:
   distributing the distributable task as a first set of sub-tasks to be performed by at least some of the plurality of processing devices, the first set of sub-tasks having at least a first sub-task and a second sub-task;
   determining whether a first set of processing devices of the plurality of processing devices that perform the first sub-task has reached a processing device performance threshold;
   in response to reaching the processing device performance threshold for the first set of processing devices, interrupting performance of the first sub-task;
   determining, in response to reaching the processing device performance threshold for the first set of processing devices of the plurality of processing devices that perform the first sub-task, whether the first sub-task has been completed by the first set of processing devices prior to the interrupt;
   upon a determination that the first sub-task has not been completed:
   determining a completed portion and a remainder portion of the first sub-task,
   determining a number of sub-tasks of a second set of sub-tasks based on the completed portion and the remainder portion, dividing the remainder portion into the determined number of sub-tasks of the second set of sub-tasks, and distributing the remainder portion as the second set of sub-tasks to be performed by at least some of the plurality of processing devices.

2. The method of claim 1, wherein the processing device performance threshold includes one or more of a memory usage threshold or a processor usage threshold.

3. The method of claim 1, wherein the processing device performance threshold is a selected number of occurrences of a processing device interrupt signal.

4. The method of claim 1, wherein the processing device performance threshold is dynamically selected for a set of processing devices of the plurality of processing devices, the set of processing devices having substantially the same processing performance.

5. The method of claim 1, wherein each sub-task of the second set of sub-tasks corresponds to a processing device workload of the completed portion, wherein the processing device workload corresponds to an amount of processing time associated with the completed portion or a number of instructions associated with the completed portion.

6. The method of claim 1, further comprising storing one or more sub-task markers, for respective results of the first set of sub-tasks and the second set of sub-tasks, at locations indicated by node identifiers of a hierarchy of child nodes, wherein each of the one or more sub-task markers corresponds to a different node identifier of the hierarchy of child nodes.

7. The method of claim 1, wherein the second set of sub-tasks comprises a single sub-task having an estimated processing device workload that is less than a processing device workload of the completed portion of the first sub-task;

the method further comprising:
storing one or more sub-task markers, for respective results of the first set of sub-tasks, at locations indicated by node identifiers of a hierarchy of child nodes, and
appending a result of the single sub-task of the second set of sub-tasks to the sub-task marker of the first sub-task.

8. The method of claim 6, wherein each of the one or more sub-task markers comprises at least one of a status indicator, a content flag, or a child count indicator.

9. The method of claim 1, further comprising assigning the first sub-task and the second sub-task to a task queue according to a plurality of different quality of service levels or a plurality of different priority levels.

10. The method of claim 9, wherein the task queue includes a plurality of queues, each of which corresponding to one of a plurality of different priority levels.

11. A distributed processing platform comprising:
a first set of processing devices; and
a second set of processing devices,
wherein the distributed processing platform carries out actions comprising:
distributing the distributable task as a first set of sub-tasks to be performed by the first set of processing devices, the first set of sub-tasks having at least a first sub-task and a second sub-task;
determining whether the first set of processing devices that perform the first sub-task has reached a processing device performance threshold;
in response to reaching the processing device performance threshold for the first set of processing devices, interrupting performance of the first sub-task;
determining, in response to reaching the processing device performance threshold for the first set of processing devices, whether the first sub-task has been completed by the first set of processing devices prior to the interrupt;
upon a determination that the first sub-task has not been completed:
determining a completed portion and a remainder portion of the first sub-task,
determining a number of sub-tasks of a second set of sub-tasks based on the completed portion and the remainder portion,
dividing the remainder portion into the determined number of sub-tasks of the second set of sub-tasks, and
distributing the remainder portion as the second set of sub-tasks to be performed by the second set of processing devices.

12. The distributed processing platform of claim 11, wherein the processing device performance threshold includes one or more of a memory usage threshold or a processor usage threshold.

13. The distributed processing platform of claim 11, wherein the processing device performance threshold is dynamically selected for a set of processing devices of the plurality of processing devices, the set of processing devices having substantially the same processing performance.

14. The distributed processing platform of claim 11, further comprising storing one or more sub-task markers, for respective results of the first set of sub-tasks and the second set of sub-tasks, at locations indicated by node identifiers of a hierarchy of child nodes, wherein each of the one or more sub-task markers corresponds to a different node identifier of the hierarchy of child nodes.

15. The method of claim 14, wherein each of the one or more sub-task markers comprises at least one of a status indicator, a content flag, or a child count indicator.

16. The distributed processing platform of claim 11, wherein the second set of sub-tasks comprises a single sub-task having an estimated processing device workload that is less than a processing device workload of the completed portion of the first sub-task;
wherein the distributed processing platform carries out actions comprising:
storing one or more sub-task markers, for respective results of the first set of sub-tasks, at locations indicated by node identifiers of a hierarchy of child nodes, and
appending a result of the single sub-task of the second set of sub-tasks to the sub-task marker of the first sub-task.

17. The method of claim 11, further comprising assigning the first sub-task and the second sub-task to a task queue according to a plurality of different quality of service levels or a plurality of different priority levels.

18. The method of claim 17, wherein the task queue includes a plurality of queues, each of which corresponding to one of a plurality of different priority levels.

19. A method for distributing a cell validation task among a plurality of processing devices of a distributed processing platform, comprising:
distributing the cell validation task as a first set of sub-tasks to be performed by at least some of the plurality of processing devices, the first set of sub-tasks having at least a first sub-task and a second sub-task;
determining whether a first set of processing devices of the plurality of processing devices that perform the first sub-task has reached a processing device performance threshold;
in response to reaching the processing device performance threshold for the first set of processing devices, interrupting performance of the first sub-task;

determining, in response to reaching the processing device performance threshold for the first set of processing devices of the plurality of processing devices that perform the first sub-task, whether the first sub-task has been completed by the first set of processing devices prior to the interrupt;

upon a determination that the first sub-task has not been completed:

determining a completed portion and a remainder portion of the first sub-task, determining a number of sub-tasks of a second set of sub-tasks based on the completed portion and the remainder portion, dividing the remainder portion into the determined number of sub-tasks of the second set of sub-tasks, and distributing the remainder portion as the second set of sub-tasks to be performed by at least some of the plurality of processing devices.

20. The method of claim 19, wherein distributing the cell validation task comprises distributing the first set of sub-tasks and the second set of sub-tasks based on a range of cells.

\* \* \* \* \*